Nov. 27, 1934. C. WILHJELM Re. 19,383

TEMPERATURE CONTROL APPARATUS

Original Filed April 19, 1929 2 Sheets-Sheet 1

INVENTOR.
Christian Wilhjelm
BY
Ivan E. A. Hinrichsen
ATTORNEY

Nov. 27, 1934. C. WILHJELM Re. 19,383

TEMPERATURE CONTROL APPARATUS

Original Filed April 19, 1929 2 Sheets-Sheet 2

Christian Wilhjelm
INVENTOR.

BY
Fran E. A. Konigsberg
ATTORNEYS.

Reissued Nov. 27, 1934 Re. 19,383

UNITED STATES PATENT OFFICE 19,383

TEMPERATURE CONTROL APPARATUS

Christian Wilhjelm, Philadelphia, Pa., assignor, by mesne assignments, to Automatic Temperature Control Co., Inc., Philadelphia, Pa., a corporation of Pennsylvania Original No. 1,829,772, dated November 3, 1931, Serial No. 356,379, April 19, 1929. Application for reissue September 27, 1932, Serial No. 635,031

25 Claims. (Cl. 236—15)

In the art of regulating the fuel supply to furnaces it has been found that many, if not all of the prior art control devices fail to correctly balance the fuel supply with the fuel demand or requirement in order to maintain the desired or predetermined operating temperature in the furnace during changing operating conditions.

So called on and off controls or stepwise operated controls will to some extent maintain a certain temperature, but only accompanied by constantly recurring fluctuations within a range which is not narrow enough for close control purposes.

The object of this invention is to provide a temperature control apparatus including means for correctly balancing the fuel supply with the fuel demand for a given temperature at varying operating conditions and whereby, when once the proper adjustment or regulation has been obtained, further variations will be practically immediately checked and controlled.

Figure 1:
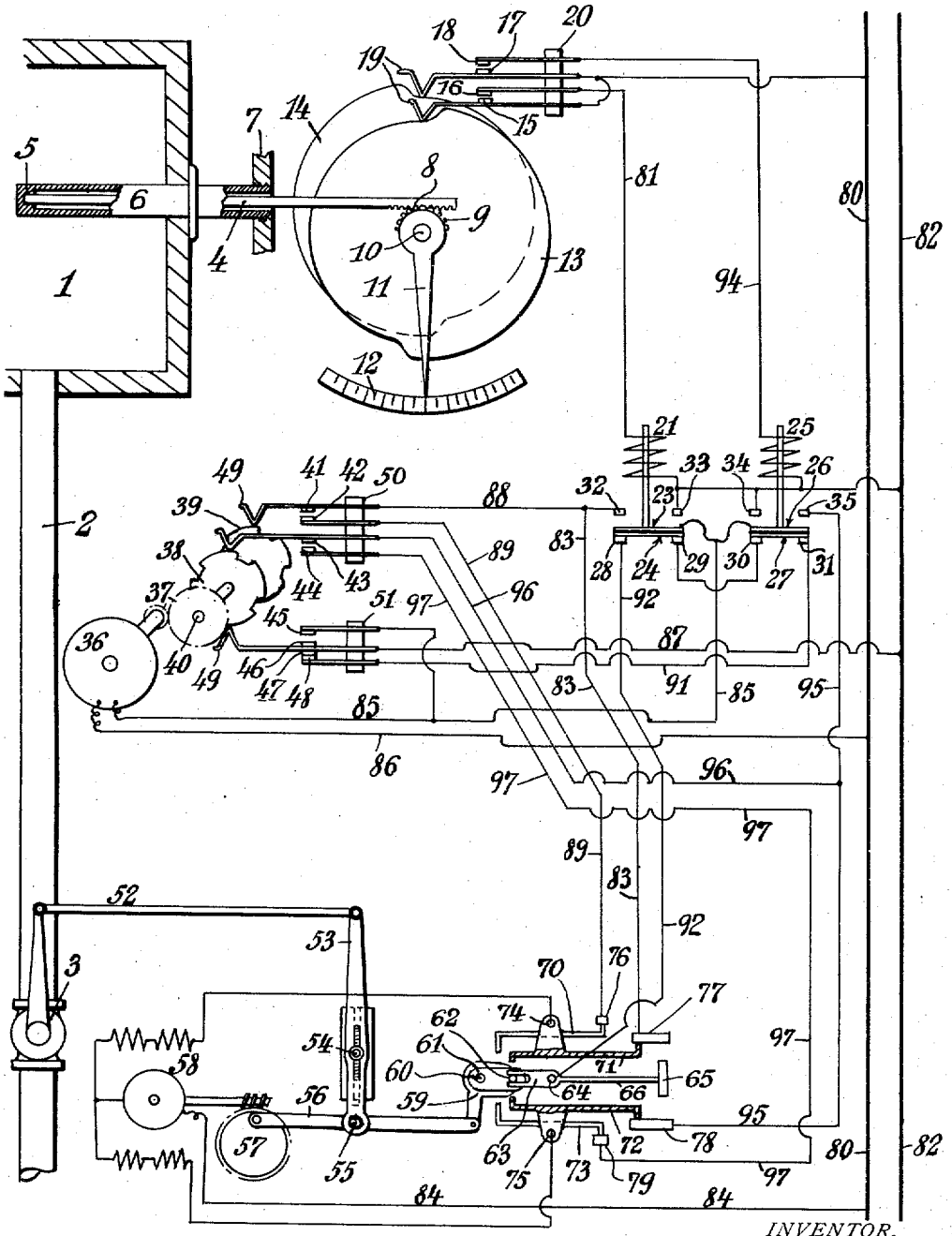
Figure 2:
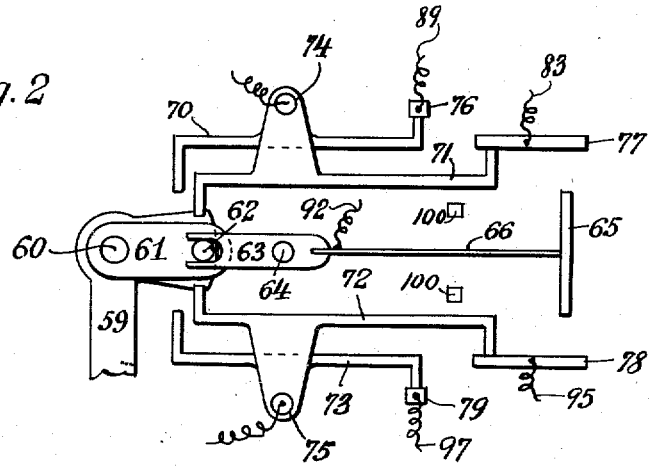
Figure 3:
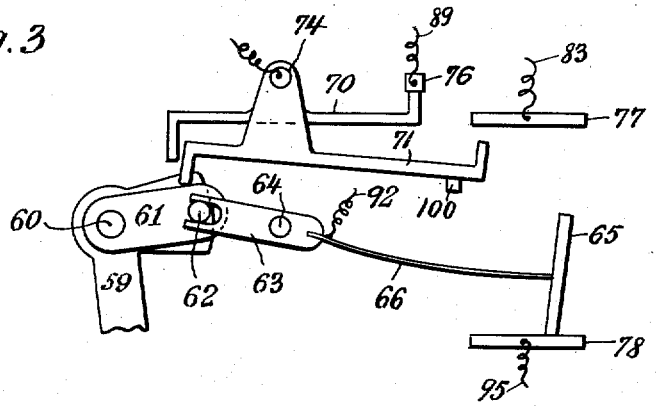
Figure 4:
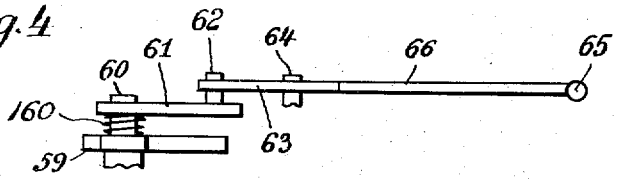

Further objects of the invention and a full understanding thereof will be more readily obtained from the following specification and explanation read together with the accompanying drawings in which Fig. 1 is a general wiring diagram illustrating the invention and Figs. 2 to 4 are diagrammatic illustrations of a certain balancing switch mechanism.

In the drawings the reference numeral 1 denotes a furnace which is heated by fuel supplied through a pipe 2 controlled by a valve 3.

A thermostat of commercial type is mounted in the furnace wall and responds to temperature changes within the furnace. The thermostat may consist of an expansible metal rod 4 which is mechanically connected at 5 to a metal tube 6 having a different coefficient of expansion than the rod. The tube is fixed in the thermostat frame 7 which is mounted immovably in any desired manner. The rod is provided with a rack 8 for operating a gear 9 on the indicator shaft 10 which carries a pointer 11 for indicating temperature changes on a scale 12. The indicator shaft also carries two contact disks 13 and 14 which are adjustably mounted on the shaft in any well known manner.

Adjacent the disks 13 and 14 there are mounted two pairs of contacts 15, 16 and 17, 18 adapted to be closed by means of resilient fingers 19 which rest on the disks. 20 is a fixed contact base.

The contacts 15, 16 and 17, 18 control the circuits through two relays which comprises a relay coil 21 having a non-conducting armature carrying a top and a bottom conducting bar 23 and 24 respectively, and a second relay coil 25 having a non-conducting armature also carrying a top and bottom conducting bar 26 and 27 respectively.

The armatures are normally in lowered positions as shown, when the bottom bars 24 and 27 bridge contacts 28, 29 and 30, 31 respectively. When the relay coils are energized the armatures are lifted and the top bars 23 and 26 bridge contacts 32, 33 and 34, 35 respectively.

The numeral 36 denotes a motor which through suitable reducing gearing 37 drives an interrupter consisting of two cams 38 and 39 mounted on the shaft 40. The interrupter cams are adapted to close certain circuits through pairs of contacts 41, 42, 43, 44, 45, 46 and open contact 47, 48 by means of resilient fingers 49 in engagement with the cams. The contacts are mounted in fixed bases 50 and 51.

The valve 3 is operated by a link 52 connected to an arm 53 which is slidably pivoted on an adjustable pivot 54. The other end of the arm is connected at 55 to a link 56 pivoted to a crank disk 57 which is driven from a reversible valve operating motor 58.

The link 56 is connected to a bell crank 59 pivoted on a stud 60. On the latter is also pivoted a switch arm 61 which carries a pin 62. Surrounding the stud 60 there is a spring 160 providing friction between the bell crank 59 and the switch arm 61, see Fig. 4.

The pin 62 is adapted to operate, i. e. oscillate a contactor arm 63 pivoted at 64. The arm 63 carries a switch contact 65 on the end of a flexible stem 66. The bell crank 59 and switch arm 61 are of non-conducting material, the stem 66 and contact 65 are of conducting material.

On both sides of the switch arms there are mounted conducting contact arms 70, 71 and 72, 73. The contact arms are pivoted in conducting pairs at 74 and 75 respectively. Switch arm 61 operates contact arms 71 and 72 to break contacts 77 and 78. Bell crank 59 operates contact arms 70 and 73 to break contacts at 76 and 79.

When the furnace is running at normal, i. e. the desired operating temperature, the parts are in the position as shown, there is no current passing through the apparatus and the valve will be opened to some extent, probably half open. When however the temperature changes for any reason, for instance decreases, the thermostat rod 4 contracts and moves the indicator shaft 10 anticlockwise and the disk 13 closes contacts 15, 16. This establishes several circuits as follows. From the line wire 80 to contacts 15, 16, wire 81 to relay 21 and out to line wire 82. The relay 21 armature is drawn up and contacts 32, 33 are connected by bar 23 whereby another circuit is made from the line 82 through 33, 23, 32 to wire 83, to 77 through contact arms 71 and 70 to the valve motor 58 and back to the line 80 through wire 84.

A third circuit is made as follows. From the line to relay contacts 33, 23, through wire 85 to the interrupter motor 36 and out through wire 86.

The closing of the first circuit referred to energizes relay 21. The drawing up of the relay armature closes the second circuit through the valve motor 58 which begins to operate and through the instrumentalities referred to opens the valve a certain distance. At the same time, however, the motor also through the connection 56 operates the bell crank 59 and switch arm 61 on the stud 60, these two elements 59 and 61 moving together because of the friction spring 160. The movement of the switch arm 61 operates contact arm 71 to break the motor circuit at 77, see Fig. 3, arm 71 being stopped against a fixed stop 100 and also by means of the pin 64, oscillates the arm 63 whereby contact 65 engages contact 78.

It will be observed that the stem 66 is flexed as shown in Fig. 3 due to the fact that contact 65 engages contact 78 before the oscillating movements of the arms 61 and 63 have ceased. The motor is now stopped and the parts of the switch mechanism are in the position shown in Fig. 3 with the bell crank 59 moved nearer towards the contact arm 70.

At this time, therefore, the valve has been opened further in order to furnish an increased fuel supply in response to the increased fuel demand caused by the lowering of the temperature. The movement of the valve, however, has necessarily been greater than required in order to make up for lost time and in order to compensate for the time lag in the furnace, and the result of the increase in the fuel supply must therefore be given an opportunity to react on the temperature before further operations of the valve are made.

If the operation of the valve has produced the required increase in the fuel supply and the temperature has been corrected within the time lag period of the particular furnace, no further opening movement of the valve is required and it must now be moved back to a new normal position, i. e. one in which the fuel supply balances the fuel demand under the changed conditions in the furnace.

If at this time the valve was merely moved back to its first operating position, I would have a simple off and on control and the operation would obviously not cause the fuel supply to balance the fuel demand. For instance if I assume that before operating the valve a given quantity of fuel is required to maintain a temperature of say 500°, and the temperature decreased as aforesaid, it is obvious that the valve must be moved to a different normal operating position in order to supply more fuel to maintain the same temperature of 500°.

Therefore, the terms normal position or operating position of the valve indicates in this specification a position which at any given time permits a flow or supply of fuel which balances the fuel demand of the furnace at that time.

Under ordinary conditions it will be found that the temperature has responded to the increased fuel supply. Consequently before the time lag period has passed the thermostat rod will commence to expand due to the rise in temperature and rotate the disks 13 and 14 clockwise thereby causing the contacts 15 and 16 to open, the relay 21 will be de-energized, its armature will fall out and the circuits broken.

At this time it is obvious that if the parts are left undisturbed with the valve opened to a greater extent than required there will be a further subsequent rise in the temperature. The valve must therefore be closed somewhat in order that the fuel supply may balance the changed requirements of the fuel demand. It is for this reason that we have the contact 65 in the switch mechanism, because thereby a circuit is made to operate the motor in the opposite direction as follows.

From the line through wire 87 to contacts 47, 48, which are closed as will be explained hereafter, to wire 91, through lower relay contacts 31, 27, 30, 29, 24, 28, to wire 92, to switch stem 66, contacts 65 and 78, arms 72 and 73 to the motor 58 and out. The motor now starts to run in the opposite direction and moves the valve to close it and brings it to a position in which the fuel requirement balances the fuel demand and at the same time, of course, the bell crank 59 has been operated to actuate contact 65 and break the motor circuit at 78 and the motor stops.

Now it will be observed that the valve is not brought back to its former position because the second motor circuit by way of the flexed stem and contact 66, 65 is of shorter duration and the motor has less drift than from the first initial circuit of longer duration through the valve motor. When the motor starts to run in the direction opposed to its initial stroke, the circuit through the motor will last only until the arm 63 has been moved sufficiently to unflex the stem 66. When this happens the contact 65 will quickly move away from contact 78. This movement is therefore shorter than the first oscillating movement which continues beyond the flexing period until arm 61 operates arm 71, and we now have the valve in a new normal operating position permitting a fuel supply which balances the increased fuel demand. This will be more readily understood when it is remembered that the interruption of the initial valve moving motor circuit is by separation of arm 71 from contact 77 (or 72 from contact 78), while the interruption of the opposite or secondary valve moving motor circuit is by separation of the contact 65 from contact 78 or 77. The degree of flexing of stem 66 is variable by variation of the length of contact 65, as by filing or other adjustment and the like. One extreme condition may maintain in which the drifting of the motor after separation of contacts 71 and 77, for example, will just cause arm 65 to slightly touch contact 78 without flexing stem 66, in which case, obviously, the slightest degree of closing of the secondary valve moving circuit is immediately terminated by separation of contacts 65 and 78 (for example) with a consequent effecting of an extremely small return movement. An alternative extreme situation is one in which the relative length of contact 65 is so great that separation of arm 71 from contact 77 is only accomplished after appreciable motor movement has occurred such as to substantially flex stem 66 whereby the return secondary opposite motor operation would need to be substantially as long in duration as the initial valve closing circuit. The only requirement for the securing of the mentioned predeterminedly smaller opposite canceling movement after a larger initial valve movement is that the initial normal clearance between contact 65 and contact 78 or 77 requires a predetermined duration of running of the motor to close, and which is less than the time of motor running required to close the initial clearance between arm 71 and contact 77, or between arm 72 and contact 78.

If, instead of a decrease in the temperature, an increase occurs, then the thermostat rod 4 expands and operates the disks 8 and 14 clockwise to close contacts 17, 18 and relay 25 is energized by way of wire 84 and lifts its armature to connect contacts 34, 35. Current then passes to the valve motor by way of the line 82, contacts 34, 26, 35, wire 95 to contact 78, to arms 72, 73 to the motor and out.

The valve is then closed somewhat until the motor circuit is broken at 78 by the engagement of arm 61 with arm 72 and the contact 65 is now moved to engage contact 77, the parts being in positions the reverse of the showing in Fig. 3.

We also at this time have a circuit to the interrupter motor 36 by way of contact 26 and wire 85 and out as before. Assuming that the closing movement of the valve is sufficient to balance the fuel demand within the time lag period, then the rod 4 will contract, contacts 17, 18 will open, relay 25 will be deenergized, the armature will drop and all the said circuits will be opened.

We also have the same circuit closed as before through the elements 82, 87, 47, 48, 91, the lower relay contacts, wire 92 to 66, 65 to 77 and to the motor to run the latter in the opposite direction to open the valve, that is bringing it back to a new normal operating position subsequent to the rise in the temperature. The switch elements are again operated and the motor circuit broken at 65, 77.

In the foregoing it has been assumed that the fuel supply has been regulated to take care of the changed fuel demand on either the plus or the minus side of the temperature within the time lag period and during these operations the valve motor 58 has been operated directly through the circuits made at the relays. However, if the valve movement in either direction has been insufficient, further movements of the valve in the respective directions are caused by way of circuits made through the valve motor under the control of the interrupter. The cams 38 and 39 will preferably be set on the shaft 40 in such a manner as to prevent closing of the interrupter controlled circuits within a time lag period, for instance the drawings show that with the shaft 40 rotating anti-clockwise, the contacts 41 to 48 inclusive will remain undisturbed until the contact fingers run off the lobes of the cams.

Assume now that the temperature has fallen and that the valve has been moved initially as described above, but that the increased fuel supply is insufficient to balance the fuel demand within the time lag period. In such a case it is obvious that one or more additional opening movements of the valve are required. In other words, further operations of the valve motor are necessary. Such additional operations are caused by the closing of circuits under the control of the interrupter as follows, it being observed that as soon as relay 21 is energized the interrupter motor commences to run.

When the lobes of the cams 38 and 39 pass from under the fingers 49 contacts 45, 46 are closed to maintain the interrupter motor circuit from the line 82, through wire 87, contacts 46, 45, wire 85, motor 36 and out.

Simultaneously therewith the contacts 41, 42 are also closed and a circuit is made from the relay contact 32, through wire 88, contacts 41, 42, wire 89 to 76 contact arm 70 to the valve motor in the same direction as the initial circuit and out. Consequently the valve motor receives a current impulse and runs until the next lobe of the cam 39 engages the finger 49 to open the contacts 41, 42 when the motor stops. This additional opening of the valve has increased the fuel supply and may or may not be sufficient to cause it to balance the fuel demand. An inspection of Fig. 3 shows that at this time the bell crank 59 will have moved closer to the contact arm 70 against the friction at 160. If the additional valve movement has been sufficient, the rise in the temperature will operate the thermostat rod 4 as above described, relay 21 will be de-energized, the circuits will open and the motor will be operated in the opposite direction via flexible contact member 66, 65 as before. The valve will therefore be brought back to a new, third, normal operating position different from its initial normal position and different from the second normal position referred to above.

From this it will be seen that in the event the initial movement of the motor 58 and the valve is insufficient, additional movements occur, one within each time lag period, until the fuel supply balances the fuel demand. In the event that correction does not take place before the bell crank 59, after repeated movements towards the arm 70, engages the arm 70 then such engagement will open the circuit at 76.

The valve will now be fully open and no further movement can occur. This, however, is an extreme case and illustrates the reason for the second contact arm 76 in the circuit. It may therefore be said that the switch mechanism comprises members 71, 72 which upon being operated balances the circuit, whereas the members 70, 73 serve more in the nature of an absolute limit switch.

The interrupter also controls the additional movements on the plus side of the apparatus when the initial valve closing movement occurs by way of the relay 25. In this case the valve motor 58 obtains additional impulses through a circuit comprising the line 82, relay contacts 34, 26, 35, wires 95, 96, interrupter contacts 43, 44, wire 97 to contact 72, to arm 73 to the motor and out. This circuit is made as often as the interrupter operates to close contacts 43, 44 until finally the bell crank 59 operates arm 73 to finally break the circuit at 72. The valve is now fully closed.

From the foregoing it will be seen that this invention provides means for correctly balancing the fuel supply to the fuel demand by opening or closing the valve from a normal running position as the case may be and thereafter automatically places the valve in a new normal running position to take care of the fuel supply as required by the new demand. That the movements of the valve therefore are corrected within the time lag period within which temperature reaction occurs whereby overshooting the temperature is prevented and hunting for the correct valve position is eliminated. Also, that by bringing the valve back to a new normal position, correction occurs on the same side of the apparatus thereby preventing wide fluctuations. In actual practice this control apparatus will in most cases provide for a balanced fuel supply by only one additional movement of the valve and a chart made from the apparatus will show little if any variations in temperature unless a material change occurs in the furnace operating conditions.

The drawings are diagrammatic for the sake of clearness and it will readily be understood that many mechanical details for adjusting purposes are omitted.

I claim:

1. In a system for regulating the temperature within a furnace having a valve controlled fuel supply, a motor for operating the valve, a main electric circuit, means in the latter for causing the motor to open the valve in response to a decrease in the temperature within the furnace and other means, automatically operated within a given time interval, for subsequently causing the motor to close the valve to a lesser extent than the said opening thereof whereby to balance the fuel supply to the fuel demand required by the said decrease in the temperature.

2. In a system for regulating the temperature within a furnace having a valve controlled fuel supply, a motor for operating the valve, a main electric circuit, means in the latter for causing the motor to close the valve in response to an increase in the temperature within the furnace and other means automatically operated within a given time interval, for subsequently causing the motor to open the valve to a lesser extent than the said closing thereof whereby to balance the fuel supply to the fuel demand required by the said increase in the temperature.

3. In a system for regulating the temperature within a furnace having a valve controlled fuel supply, a motor for operating the valve, an electric circuit, means in the circuit to cause said motor to operate the valve in a certain direction in response to a change in the temperature within the furnace, a switch mechanism in said circuit for subsequently causing said motor to again operate the valve within a predetermined time interval in the opposite direction to a lesser extent than the said first operation and means operated by the motor to actuate said switch mechanism.

4. In a system for regulating the temperature within a furnace having a valve controlled fuel supply, a motor for operating the valve, an electric circuit, means in said circuit to cause the motor to operate the valve in a certain direction in response to a change in the temperature within the furnace, other means in said circuit for subsequently causing the motor to again operate the valve in the said certain direction after a predetermined time interval and to a lesser extent than the said first valve operation if the temperature change is not corrected and mechanism for causing the motor to operate the valve in a direction opposite to the aforesaid when the temperature returns to normal.

5. In a system for regulating the temperature within a furnace having a valve controlled fuel supply, a main electric circuit, a motor for operating the valve, means in said main circuit for causing the motor to operate the valve in a certain direction in response to a change in temperature within the furnace, a mechanism in said circuit for establishing a regularly interrupted circuit through the motor to cause the motor to further operate the valve in said certain direction and a switch mechanism in said circuit for causing the motor to operate the valve in the opposite direction to a lesser extent than the extent of the preceding valve operations.

6. In a system for regulating the temperature within a furnace having a valve controlled fuel supply, a normally open main electric circuit, a motor for operating the valve, means in said circuit for automatically establishing a first circuit for causing the motor to operate the valve in a certain direction in response to a change in temperature within the furnace, other means in said circuit for establishing a second regularly interrupted circuit for causing the motor to subsequently operate the valve further in the said certain direction if the temperature does not return to normal after the first valve operation and a switch mechanism in said main circuit for establishing a circuit for causing the motor to operate the valve in the opposite direction within a given time interval elapsing after the first operation of the valve or after any of the subsequent operations thereof when the temperature becomes normal.

7. In a system for regulating the temperature within a furnace having a valve controlled fuel supply, a normally open main electric circuit, a motor for operating the valve, means in said circuit for automatically establishing a first circuit for causing the motor to operate the valve in a certain direction in response to a change in temperature within the furnace, other means in said circuit for establishing a second regularly interrupted circuit for causing the motor to subsequently operate the valve further in the said certain direction if the temperature does not return to normal after the first valve operation, means in said second circuit for interrupting the same for periods equal to the time lag period of the furnace, and a switch mechanism in said main circuit for establishing a circuit for causing the motor to operate the valve in the opposite direction within any time lag period elapsing after the first operation of the valve or after any of the subsequent operations thereof when the temperature becomes normal.

8. In an automatic valve system, a method of securing a desired valve position at which fuel demand and fuel supply are substantially balanced which consists when furnace conditions change and unbalance of fuel supply and demand occurs in subjecting the valve to a movement in one direction to over-correct for such unbalance of demand and supply, and then in subjecting the valve to another but opposite and predetermined-ly smaller movement to only partially cancel the over-correction to reestabish substantial balance of fuel demand and supply comporting with the change in furnace conditions.

9. In a system for regulating the temperature within a furnace having a valve controlled fuel supply, a motor for operating the valve, a main electric circuit, means in the latter for causing the motor to open the valve in response to a decrease in the temperature within the furnace and other means automatically operating for subsequently causing the motor to close the valve such subsequent movement being always to a lesser extent than the said opening thereof whereby to balance the fuel supply to the fuel demand required by the said decrease in temperature.

10. In a system for regulating the temperature within a furnace having a valve controlled fuel supply, a motor for operating the valve, a main electric circuit, means in the latter for causing the motor to close the valve in response to an increase in the temperature within the furnace and other means automatically operating for subsequently causing the motor to open the valve such subsequent movement being always to a lesser extent than the said closing thereof whereby to balance the fuel supply to the fuel demand required by the said increase in temperature.

11. In a system for regulating the temperature within a furnace having a valve controlled fuel supply, a motor for operating the valve, an electric circuit, means in the latter for subsequently causing the valve to move to vary the flow of fuel in response to a variation in temperature within the furnace, and other means automatically operating for causing the motor to move the valve to oppositely vary the flow of fuel always to a lesser extent than the first mentioned movement thereof whereby to balance the fuel supply to the fuel demand required by the said variation in temperature.

12. In a control system for furnaces having a valve controlled fuel supply, means establishing an initial valve setting for the fuel supply in substantial balance to fuel demands, means for progressively varying the substantialy balanced setting of the fuel supply valve in response to variations in the demands of the furnace, each new balanced setting of the fuel supply valve being always a resultant of an appreciable variation of the valve setting for the fuel supply and an opposite partially cancelling variation of the valve setting for the fuel supply.

13. In a system for regulating the temperature within a furnace having a valve controlled fuel supply arranged to establish substantial balance between the fuel demands of the furnace and the fuel supply as determined by the existence of the furnace temperature within given limits, means responsive to variation of furnace temperatures and therefore to unbalance of fuel demands, means operatively associated with the responsive means to vary the fuel supply to an overcorrecting degree in response to variation in fuel demands, and means automatically responsive to the same fuel demand variation to subsequently change the fuel supply to a predeterminedly smaller opposite degree of variation.

14. In a system for regulating the temperature within a furnace having a valve controlled fuel supply arranged to establish substantial balance between the fuel demands of the furnace and the fuel supply as determined by the existence of the furnace temperature within given limits, means responsive to variation of furnace temperatures and therefore to unbalance of fuel demands, means operatively associated with the responsive means to vary the fuel supply to an appreciable degree to correct for the variation in fuel demand, and means automatically responsive to such variation in fuel supply to subsequently change the fuel supply to a predeterminedly smaller opposite degree of variation to again establish substantial balance between fuel demand and fuel supply.

15. In a system for regulating the temperature within a furnace having a valve controlled fuel supply arranged to establish substantial balance between the fuel demands of the furnace and the fuel supply as determined by the existence of the furnace temperature within given limits, means responsive to variation of furnace temperatures and therefore to unbalance of fuel demands, means operatively associated with the responsive means to subject the valve to a plurality of controlling movements to correct for a variation in furnace temperatures, said movements being always partially cancelling in direction and degree to establish a secondary valve setting of substantial balance between fuel supply and fuel demand.

16. In a system for regulating the temperature within a furnace having a valve controlled fuel supply arranged to establish substantial balance between the fuel demands of the furnace and the fuel supply as determined by the existence of the furnace temperature within given limits, means responsive to variation of furnace temperatures and therefore to unbalance of fuel demands, means operatively associated with the responsive means to vary the fuel supply in response to and in degree as a function of variation of such temperature to overcorrect for such variation, said means arranged sequentially automatically oppositely to vary the fuel supply so as inevitably partially to cancel the first mentioned variation of fuel supply.

17. In a system for regulating the temperature within a furnace having a valve controlled fuel supply arranged to establish substantial balance between the fuel demands of the furnace and the fuel supply as determined by the existence of the furnace temperature within given limits, means responsive to variation of furnace temperatures and therefore to unbalance of fuel demands, means operatively associated with said responsive means to vary the valve setting of the fuel supply as a function of the variation in temperature in the furnace to overcorrect for the temperature variation, said means arranged automatically and predeterminedly only consequently to modify and partially to cancel the variation in valve setting.

18. In a system for regulating the temperature within a furnace having a valve controlled fuel supply arranged to establish substantial balance between the fuel demands of the furnace and the fuel supply as determined by the existence of the furnace temperature within given limits, means responsive to variation of furnace temperatures and therefore to unbalance of fuel demands, means operatively associated with the responsive means to automatically initiate and consummate a cycle of valve controlling operations upon a variation in furnace temperature, said cycle comprising a primary variation of fuel supply followed inevitably by an opposite partially cancelling secondary variation of the fuel supply.

19. In a system for regulating the temperature within a furnace having a valve controlled fuel supply arranged to establish substantial balance between the fuel demands of the furnace and the fuel supply as determined by the existence of the furnace temperature within given limits, means responsive to variation of furnace temperatures and therefore to unbalance of fuel demands, means operatively associated with the responsive means to automatically initiate and consummate a cycle of valve controlling operations upon a variation in furnace temperature, said cycle comprising a primary variation of fuel supply followed inevitably by an opposite partially cancelling secondary variation of the fuel supply, said primary variation being in degree a function of the variation in temperature.

20. In a system for reguating the temperature within a furnace having a valve controlled fuel supply arranged to establish substantial balance between the fuel demands of the furnace and the fuel supply as determined by the existence of the furnace temperature within given limits, means responsive to variation of furnace temperatures and therefore to unbalance of fuel demands, means operatively associated with the responsive means to automatically initiate and consummate a cycle of valve controlling operations upon a variation in furnace temperature, said cycle comprising a primary variation of fuel supply followed inevitably by an opposite partially cancelling secondary variation of the fuel supply, said primary variation being in degree a function both of the variation in temperature and of a time interval.

21. In a system for regulating the temperature within a furnace having a valve controlled fuel supply, means for varying the volume of fuel passing through the valve a degree dependent upon the extent of variation of furnace temperatures from a given range to overcorrect for same, and means for automatically predeterminedly partially cancelling such volume variation to establish a new valve setting pursuant to the first mentioned volume variation.

22. In automatic temperature control systems, the method of securing balance of fuel supply to fuel demands to substantially maintain a given operating temperature, which consists in proportioning fuel supply to given fuel demands to establish an initial setting for the fuel supply, in securing an indication of unbalance of fuel demand, in varying the fuel supply to overcorrect for the unbalance of fuel demand, then during the time lag of the furnace securing further indications of fuel demand, and then responsive to the existence of such further indication again varying the fuel supply toward greater overcorrection, then finally partially cancelling the overcorrection to a new normal setting for the fuel supply.

23. The method of securing automatic temperature control in which the fuel supply is substantially balanced against fuel demands of a furnace, which consists in establishing instantaneously substantial balance between fuel flow and fuel demands to maintain an operating temperature within a given range with an initial fuel flow setting, in varying the fuel flow in response to unbalance between fuel flow and fuel demand to a degree a function of such unbalance, then in predeterminedly oppositely varying the fuel flow as a different function of such unbalance to establish a new fuel flow setting in instantaneous substantial balance with fuel demands.

24. In an automatic valve control system, a method of moving a valve from an instant position at which unbalance of fuel demand and supply exists to a desired position at which substantial balance of fuel demand and supply is attained, which consists in subjecting the valve to successive movements in a direction toward and in degree beyond the desired position as a function of such unbalance, then subjecting the valve to an opposite movement to return it to the desired position inevitably spaced from the instant position when the temperature returns substantially to a predetermined normal.

25. In an automatic temperature control system, a fuel supply line, a valve in the line, a temperature responsive device having a normal holding range and susceptible to selective deviation on either side of said range and affected by the fuel supply, a motor for operating the valve, electric circuits controlled by the device, means in the circuits for operating the motor to move the valve in a selected direction in response to a deviation of the device from the holding range in one direction to change the fuel supply ultimately to urge the device toward the holding range, and means automatically operative for causing the motor to move the valve in the opposite direction to a predeterminedly smaller degree before the device has deviated from the holding range in its other direction.

CHRISTIAN WILHJELM.